No. 654,528.  
K. A. ENLIND.  
NON-SLIPPING PNEUMATIC TIRE.  
(Application filed Dec. 9, 1899.)  
Patented July 24, 1900.
(No Model.)
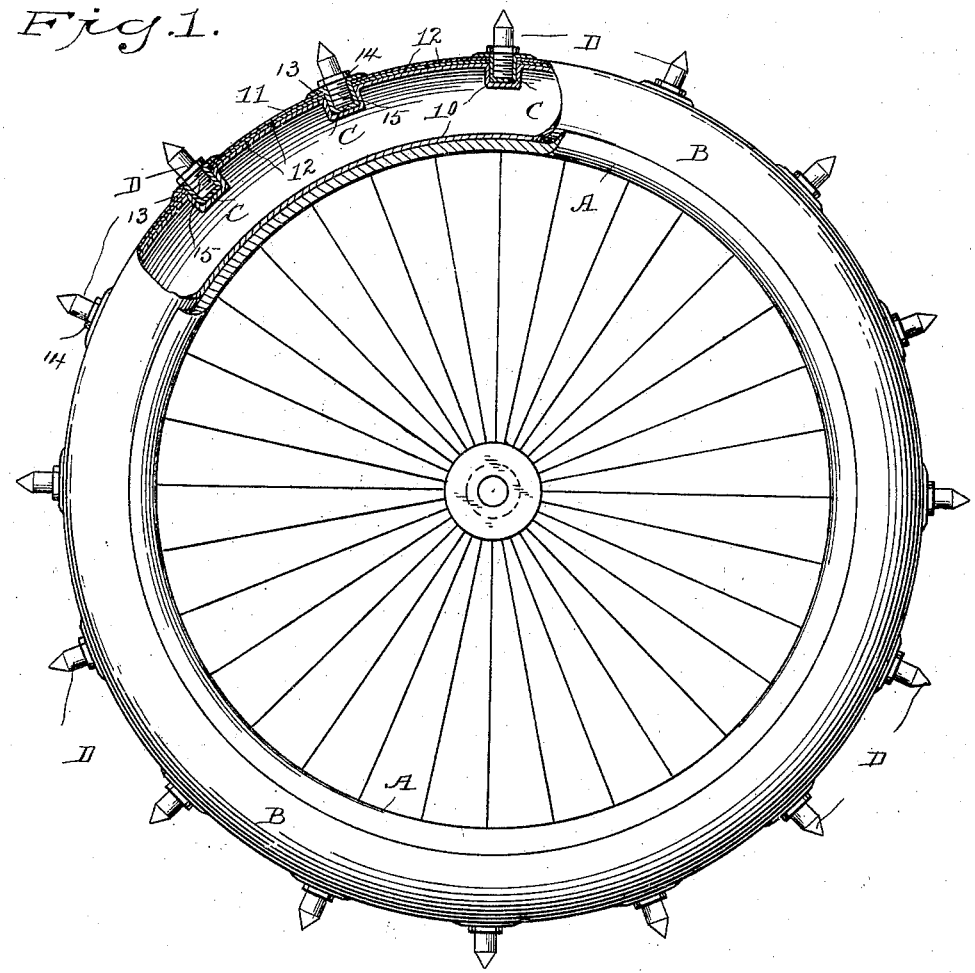
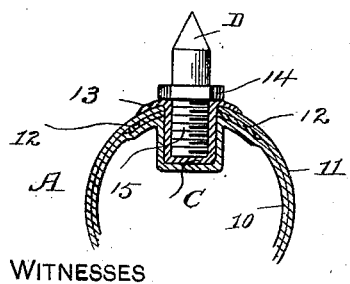
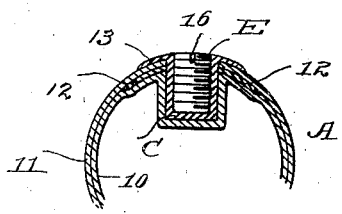
WITNESSES  
H. A. Lamb  
S. H. Atherton
INVENTOR  
Knute Arvid Enlind  
By A. M. Wooster  
Atty.
THE NORRIS PETERS CO., PHOTO-LITHO., WASHINGTON, D. C.

UNITED STATES PATENT OFFICE.

KANUTE ARVID ENLIND, OF NAUGATUCK, CONNECTICUT.

NON-SLIPPING PNEUMATIC TIRE.

SPECIFICATION forming part of Letters Patent No. 654,528, dated July 24, 1900.

Application filed December 9, 1899. Serial No. 739,798. (No model.)

*To all whom it may concern:*

Be it known that I, KANUTE ARVID ENLIND, a citizen of the United States, residing at Naugatuck, county of New Haven, State of Connecticut, have invented a new and useful Non-Slipping Pneumatic Tire, of which the following is a specification.

My invention has for its object to provide a pneumatic tire adapted for vehicle-wheels generally—as, for example, bicycles and business and pleasure wagons—but especially adapted for the wheels of the various classes of power-driven vehicles which are generically known as "automobiles."

Heretofore, automobiles, whether driven by electricity, steam, compressed air, ammonia-gas, or other source of mechanical power, have been practically useless in icy weather, especially upon grades, owing to the fact that the wheels would slip to such an extent as to make the vehicle uncontrollable. I am aware that various forms of traction-wheels provided with spurs have heretofore been used. My invention, however, provides a pneumatic tire adapted for use upon the wheels of automobiles and other vehicles and which under the circumstances of ordinary use is practically identical with ordinary pneumatic tires, with the additional feature that it is puncture-proof, but which shall be so constructed that the periphery may be quickly provided with spurs that will enable the vehicle to be used upon icy roads or to climb hills, each tire being provided with threaded sockets and interchangeable plugs and spurs being provided, which may be shifted in a moment's time without other tools than a wrench and screw-driver and by any person skilled or unskilled, so that a single set of tires costing relatively but a trifle more than ordinary tires may be made to serve equally well under the conditions of ordinary use or of hill-climbing in icy weather. With these ends in view I have devised the simple and novel non-slipping pneumatic tire, which I will now describe, referring to the accompanying drawings, forming part of this specification and using reference characters to designate the several parts.

Figure 1 is an elevation illustrating one of my novel non-slipping pneumatic tires as applied to a wheel, a portion of the rim and tire being broken away to show the construction of the sockets and the manner in which they are secured in the tire; Fig. 2, a transverse section, on an enlarged scale, of the tire at one of the sockets, showing a spur in position for use; and Fig. 3 is a similar view showing a plug in position as under the conditions of ordinary use.

A denotes the rim of the wheel, and B the tire as a whole. The special construction of the tire proper is not of the essence of my invention. By that I mean that it is immaterial of how many layers the tire is composed or the material of the layers or how they are secured together, it being of course essential in all tires of this class that an inner air-tight layer be provided, which I have indicated by 10, and that said air-tight layer be inclosed in an outer protective layer, which I have indicated by 11. For the purposes of this specification, therefore, I shall speak of the tire proper as consisting of inner and outer layers, it being wholly immaterial, so far as my present invention is concerned, if any or how many intermediate layers may be used.

C denotes internally-threaded sockets which are firmly secured in the outer periphery of the tire and which open outward. An essential feature of these sockets is that they are provided with inner plates 12 and outer plates 13, both of which are curved longitudinally and transversely to correspond with the curvature of the tire and between which the outer layer of the tire is firmly clamped. The outer plates may be circular in plan view. The inner plates are preferably made wider than the outer plates—for example, the full width of the tread of the wheel in use—and are preferably made long enough, so that when the tire is inflated their ends will be one thirty-second of an inch (more or less) apart, it being deemed preferable to leave a little space between the ends of the plates, so as to enable the tire to collapse perfectly when deflated, but to have their ends as close together in the inflated condition of the tire as is practicable, so that as large a portion of the tread of the tire as possible may be thereby made puncture proof.

The special mode in which the sockets and plates are made and assembled is not of the essence of my invention. It is sufficient that said parts be so constructed that in the assembled position said plates and the socket are rigidly secured together and the outer layer of the tire is securely clamped between the plates. In the drawings I have indicated that the outer plates and sockets are formed integral and that the sockets are passed through openings in the inner plates. As stated above, however, my invention is in no respect limited to any special mode of manufacture, but comprises the structure irrespective of the mode of production.

D denotes spurs which are provided with bases 14, which are made angular or are provided with recesses to adapt them to receive a wrench and which in the assembled position lie in engagement with the outer plate, as clearly shown in Fig. 2, and with threaded shanks 15, which engage the threaded sockets.

E denotes threaded plugs which are adapted to fill the sockets under the conditions of ordinary use—that is, when the spurs are not required. These plugs are preferably provided with slots 16 to receive a screw-driver for the purpose of turning them in or out.

The use of my novel tire will be too obvious to require description in detail. It is deemed quite sufficient for the purposes of this specification to say that under the conditions of ordinary use plugs E remain in the sockets. In icy weather or when for any reason there is danger of the tire slipping or sliding a portion or all of the plugs may be removed by a screw-driver and the shanks of the spurs turned into the threaded sockets by means of a wrench.

Having thus described my invention, I claim—

1. The combination with the inner and outer layers of a pneumatic tire, of a threaded socket which passes through the outer layer but not through the inner layer, and inner and outer plates both of which are fixed to the socket, the outer layer of the tire being securely clamped between said plates.

2. The combination with the inner and outer layers of a pneumatic tire, of plates 12 lying between said layers their ends being in proximity but not in contact, threaded sockets passing through the outer layer and plates 12 but not through the inner layer, and an outer plate between which and the inner plate the outer layer is securely clamped.

3. The combination with the inner and outer layers of a pneumatic tire, of plates 12 between said layers, threaded sockets which pass through the outer layer and plates 12, outer plates attached to the sockets between which and the inner plates the outer layer is clamped, and spurs having threaded shanks engaging the sockets and bases which rest against the outer plates.

4. The combination with the inner and outer layers of a pneumatic tire, of inner and outer plates, threaded sockets fixed to the outer plates and passing through the outer layer and the inner plates and interchangeable plugs and spurs threaded to engage the sockets.

In testimony whereof I affix my signature in presence of two witnesses.

KANUTE ARVID ENLIND.

Witnesses:
S. D. BINGHAM,
N. S. WILMOT.